US 9,213,476 B2

(12) United States Patent
Lim et al.

(10) Patent No.: US 9,213,476 B2
(45) Date of Patent: Dec. 15, 2015

(54) APPARATUS AND METHOD FOR REPRODUCING MUSIC IN MOBILE TERMINAL

(75) Inventors: Min-Taik Lim, Seoul (KR); Jeong-Hyuk Yoon, Seoul (KR); Tae-Hun Kim, Incheon (KR); Hye-Jin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 847 days.

(21) Appl. No.: 12/246,390

(22) Filed: Oct. 6, 2008

(65) Prior Publication Data

US 2009/0091550 A1    Apr. 9, 2009

(30) Foreign Application Priority Data

Oct. 4, 2007    (KR) .................. 10-2007-0100029

(51) Int. Cl.
*G06F 3/0488* (2013.01)
*H04M 1/725* (2006.01)

(52) U.S. Cl.
CPC ......... *G06F 3/0488* (2013.01); *H04M 1/72558* (2013.01); *H04M 2250/22* (2013.01)

(58) Field of Classification Search
CPC ............ G06F 3/0488; H04M 2250/22; H04M 1/72558
USPC .................. 345/156, 173; 715/863
See application file for complete search history.

(56) References Cited

U.S. PATENT DOCUMENTS

| | | | |
|---|---|---|---|
| 5,734,719 A * | 3/1998 | Tsevdos et al. ............... | 700/234 |
| 6,104,334 A * | 8/2000 | Allport .......................... | 341/175 |
| 6,570,557 B1 * | 5/2003 | Westerman et al. .......... | 345/173 |
| 6,668,377 B1 | 12/2003 | Dunn | |
| 6,731,312 B2 * | 5/2004 | Robbin ......................... | 715/792 |
| 7,002,556 B2 * | 2/2006 | Tsukada et al. ............... | 345/173 |
| 7,305,713 B1 * | 12/2007 | Crance .............................. | 726/33 |
| 8,217,905 B2 * | 7/2012 | Kim et al. ..................... | 345/173 |
| 2001/0030660 A1 * | 10/2001 | Zainoulline .................... | 345/720 |
| 2002/0196238 A1 | 12/2002 | Tsukada et al. | |
| 2003/0126605 A1 * | 7/2003 | Betz et al. ....................... | 725/39 |
| 2003/0159567 A1 | 8/2003 | Subotnick | |
| 2005/0010955 A1 * | 1/2005 | Elia et al. ........................ | 725/88 |
| 2005/0146534 A1 * | 7/2005 | Fong et al. .................... | 345/619 |
| 2007/0085840 A1 * | 4/2007 | Asaka et al. .................. | 345/173 |

(Continued)

FOREIGN PATENT DOCUMENTS

| | | |
|---|---|---|
| AU | 2007100826 | 9/2007 |
| CN | 1991728 | 7/2007 |

(Continued)

OTHER PUBLICATIONS

Korean Intellectual Property Office Application Serial No. 10-2007-0100029, Office Action dated Sep. 25, 2013, 4 pages.

(Continued)

*Primary Examiner* — Temesgh Ghebretinsae
*Assistant Examiner* — Benyam Ketema
(74) *Attorney, Agent, or Firm* — Lee, Hong, Degerman, Kang & Waimey

(57) ABSTRACT

A method and mobile terminal for reproducing contents is provided. A list of a plurality of contents is displayed and a touch input is detected to select at least one of the plurality of contents from list, with the selected at least one of the plurality of contents reproduced either entirely or partially according to a type of the detected touch input.

2 Claims, 8 Drawing Sheets

(56) References Cited

U.S. PATENT DOCUMENTS

| | | |
|---|---|---|
| 2008/0019240 A1* | 1/2008 | Araki et al. .................. 369/47.1 |
| 2008/0122796 A1* | 5/2008 | Jobs et al. ..................... 345/173 |
| 2008/0126935 A1* | 5/2008 | Blomgren ..................... 715/716 |
| 2008/0163119 A1* | 7/2008 | Kim et al. ..................... 715/840 |
| 2008/0163384 A1* | 7/2008 | Crance ............................ 726/33 |
| 2008/0278441 A1* | 11/2008 | Larsen .......................... 345/156 |
| 2009/0064056 A1* | 3/2009 | Anderson et al. ............. 715/864 |
| 2009/0064236 A1* | 3/2009 | Lee et al. ........................ 725/62 |
| 2009/0093276 A1* | 4/2009 | Kim et al. ..................... 455/566 |
| 2009/0100462 A1* | 4/2009 | Park et al. ....................... 725/38 |
| 2009/0320075 A1* | 12/2009 | Marko ............................. 725/56 |
| 2010/0188353 A1* | 7/2010 | Yoon et al. .................... 345/173 |
| 2010/0218663 A1* | 9/2010 | Choi ................................ 84/609 |

FOREIGN PATENT DOCUMENTS

| | | |
|---|---|---|
| KR | 10-2006-0131152 | 12/2006 |
| KR | 10-2007-0034192 | 3/2007 |
| KR | 10-2007-0044539 | 4/2007 |
| KR | 10-2007-0062911 | 6/2007 |

OTHER PUBLICATIONS

European Patent Office Application Serial No. 08017398.2, Search Report dated Apr. 1, 2014, 6 pages.

Korean Intellectual Property Office Application Serial No. 10-2007-0100029, Office Action dated Oct. 16, 2014, 4 pages.

* cited by examiner

APPARATUS AND METHOD FOR REPRODUCING MUSIC IN MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-0100029, filed in Korea on Oct. 4, 2007, the contents of which is incorporated by reference herein in its entirety.

FIELD OF THE INVENTION

The present invention relates to user interface (UI) of a mobile terminal.

DESCRIPTION OF THE RELATED ART

A mobile terminal is a device that can be carried around and has one or more functions such as to perform voice and video call communication, inputting and outputting of information, storing data, and the like.

As such functions become more diversified, the mobile terminal can support more complicated functions such as capturing images or video, reproducing music or video files, playing games and receiving broadcast signals. By comprehensively and collectively implementing such functions, the mobile terminal may be embodied in the form of a multimedia player or device.

In order to implement various functions of such multimedia players or devices, the mobile terminal requires sufficient hardware or software support, for which numerous attempts are being made and implemented. For example, a user interface (UI) environment is provided to allow users to easily and conveniently search and select functions.

Also, mobile terminals must have various designs since users consider their mobile terminal to be a personal portable device that may express their personality. Folder type, slide type, bar type and rotation type designs may be applied to mobile terminals and efforts have been made to provide a more convenient UI to users.

SUMMARY OF THE INVENTION

In one aspect of the present invention, a method for reproducing contents in a mobile terminal is provided. The method includes displaying a list of a plurality of contents, detecting a touch input to select at least one of the plurality of contents from list and reproducing the selected at least one of the plurality of contents either entirely or partially according to a type of the detected touch input.

It is contemplated that reproducing the selected at least one of the plurality of contents includes determining the type of the detected touch input as either a single touch or a multiple touch. It is further contemplated that the selected at least one of the plurality of contents is reproduced partially if one touch is detected within a specified period of time and the selected at least one of the plurality of contents is reproduced entirely if more than one touch is detected within the specified period of time.

It is contemplated that the specified period of time for detecting the one touch and the duration for partially reproducing the selected at least one of the plurality of contents are set by a user. It is further contemplated that reproducing the selected at least one of the plurality of contents includes determining the type of the detected touch input as either a single-point touch or a multiple-point touch.

It is contemplated that the selected at least one of the plurality of contents is reproduced partially if the single-point touch is detected and the selected at least one of the plurality of contents is reproduced entirely if the multiple-point touch is detected. It is further contemplated that a duration for partially reproducing the selected at least one of the plurality of contents is set by a user.

It is contemplated that reproducing the selected at least one of the plurality of contents includes determining the type of the detected touch input as either a short touch or a long touch. It is further contemplated that the selected at least one of the plurality of contents is reproduced partially if the touch is detected for shorter than a specified duration and the selected at least one of the plurality of contents is reproduced entirely if the touch input is detected for longer than the specified duration.

It is contemplated that the specified duration for detecting the touch input and the duration for partially reproducing the selected at least one of the plurality of contents are set by a user. It is further contemplated that reproducing the selected at least one of the plurality of contents includes determining the type of the detected touch input as either a touch at a first region of a display or a touch at a second region of the display.

It is contemplated that a duration for partially reproducing the selected at least one of the plurality of contents is set by a user. It is further contemplated that reproducing the selected at least one of the plurality of contents includes reproducing the selected at least one of the plurality of contents while the touch input is detected at a specific one of the first region or second region.

In another aspect of the present invention, a mobile terminal is provided. The mobile terminal includes a display displaying a list of a plurality of contents, an input module detecting a touch input to select at least one of the plurality of contents and a controller determining the type of the detected touch input and reproducing the selected at least one of the plurality of contents either entirely or partially according to a type of the detected touch input.

It is contemplated that the controller determines the touch input as either single touch or a multiple touch. It is further contemplated that the controller reproduces the selected at least one of the plurality of contents partially if one touch is detected within a specified period of time and reproduces the selected at least one of the plurality of contents entirely if more than one touch is detected within the specified period of time.

It is contemplated that the controller determines the specified period of time and a duration for partially reproducing the selected at least one of the plurality of contents according to a user input. It is further contemplated that the controller determines the touch input as either a single-point touch or a multiple-point touch.

It is contemplated that the controller reproduces the selected at least one of the plurality of contents partially if the single-point touch is detected and reproduces the selected at least one of the plurality of contents entirely if the multiple-point touch is detected. It is further contemplated that the controller determines a duration for partially reproducing the selected at least one of the plurality of contents according to a user input.

It is contemplated that the controller determines the touch input as either short touch or a long touch. It is further contemplated that the controller reproduces the selected at least one of the plurality of contents partially if the touch is detected for shorter than a specified duration and reproduces the selected at least one of the plurality of contents entirely if the touch is detected for longer than the specified duration.

It is contemplated that the controller determines the specified duration for detecting the touch and a duration for partially reproducing the selected at least one of the plurality of contents according to a user input. It is further contemplated that the controller determines the touch input as either a touch at a first region of the display or a touch at a second region at the display.

It is contemplated that the controller determines a duration for partially reproducing the selected at least one of the plurality of contents according to a user input. It is further contemplated that the controller reproduces the selected at least one of the plurality of contents only while the touch input is detected at a specific one of the first region or the second region.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Reference will be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

The suffixes 'module', 'unit' and 'part' are given in the following description for elements in order to facilitate this disclosure only. Therefore, significant meanings or roles are not implied for the suffixes and it is understood that the terms 'module', 'unit' and 'part' can be used interchangeably.

The term 'multimedia contents' refers to various information including a medium constructed with audio, characters, figures, moving pictures or a combination thereof.

The term 'synchronization' refers to content and/or time relation of multimedia content being maintained between a mobile terminal connected to an external device in order to enable automatically sharing the multimedia content previously classified in the external device by a user with the mobile terminal.

The term 'multimedia content management protocol mode' refers to a connection mode enabling mutual synchronization when a mobile terminal is connected to an external device. For example, the 'multimedia content measurement protocol' may be the MTP (media transfer protocol) mode proposed by Microsoft Corporation.

The term 'non-multimedia content management protocol' refers to every connection mode except the 'multimedia content management protocol mode' that enables connecting a mobile terminal to an external device. The term 'non-multimedia content management protocol mode' includes a mass storage mode and a data service mode. For example, the mass storage mode may be a UMS (USB (universal serial bus) mass storage) mode and the data service mode may be PC sync.

Figure 1:
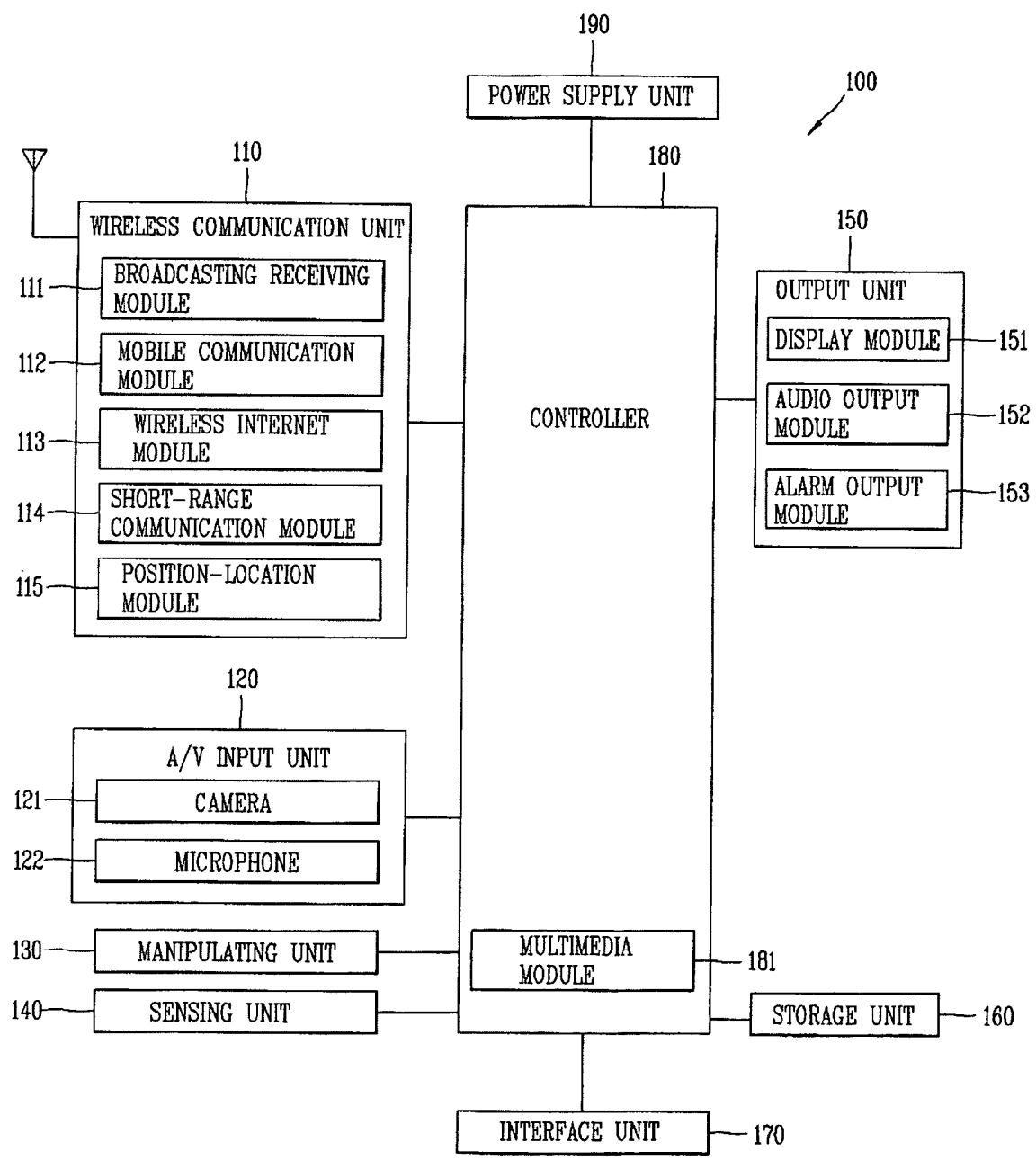
FIG. 1 is a schematic block diagram of a mobile terminal implementing an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system that transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video.

The microphone 122 receives an external audio signal while the mobile terminal 100 is in a particular mode, such as phone call mode, recording mode and voice recognition. This audio signal is processed and converted into digital data. The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones and/or cameras may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 may be implemented to couple the mobile terminal 100 with external devices. Typical external devices include wired/wireless headphones, external chargers, power supplies, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images that are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
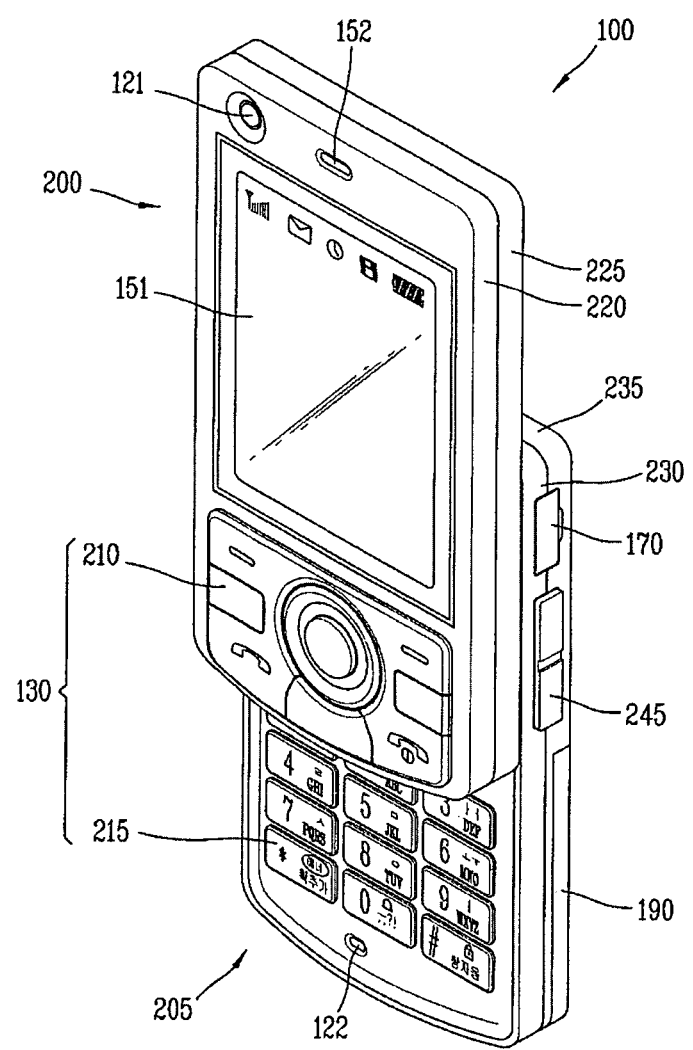
FIG. 2 is a front perspective view of mobile terminal implementing an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The front case 220 and second case 225 of the first body 200 and the first case 230 and second case 235 or the second body 205 are usually formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit, positioned along the side of second body. Preferably, the side keys 245 are configured as hot keys, such that the side keys are associated with a particular function of the mobile terminal 100.

The input unit 130 implemented using function keys 210 and a keypad 215 and side keys 245 may be referred to as a manipulating portion. Various methods can be utilized for the manipulation portion as long as a user may operate it in a tactile manner. The manipulating portion performs various inputs to reproduce contents when contents reproducing is performed via a keypad input rather than via a touch input.

The manipulating portion can be implemented as a dome switch or touch pad that can receive user commands or information via pressing, pushing or touching. The manipulation portion may alternately be implemented as a dial, a wheel, a jog element or a joystick in order to allow user manipulation.

The keypad 215 is used for inputting commands such as 'start', 'end', or 'scroll'. The keypad 215 is used for inputting numbers, characters or symbols. The side keys 245 can be operated to support a hot key function, such as speed dialing or dedicated key inputs, for activating a special function of the mobile terminal 100. The microphone module 122 may be implemented to be suitable for receiving the user's voice and other various sounds.

An interface unit 170 is shown positioned adjacent to the side keys 245. A power supply 190 in a form of a battery is shown located on a lower portion of the second body 205. The power supply unit 190 may be, for example, a rechargeable battery that can be detached.

The interface unit 170 may be used as a link passage or path through which the terminal can exchange data with an external device. For example, the interface unit 170 may be implemented as a connection port for connecting an earphone to the mobile terminal via a fixed or wireless means, power supply ports for providing power to the external device or a port for short-range communications, such as an Infrared Data Association (IrDA) port, a Bluetooth™ port, or a wireless LAN port.

The interface unit 170 may be a card socket for accommodating an external card, such as a Subscriber Identity Module (SIM), a User Identity Module (UIM), or a memory card for storing information.

Figure 3:
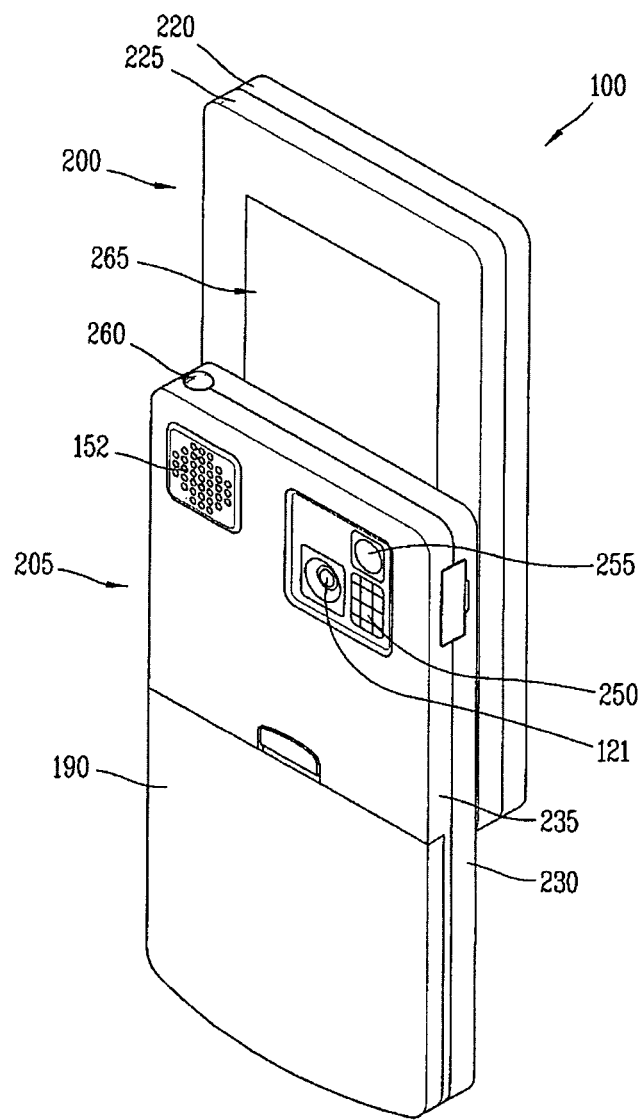
FIG. 3 is a rear perspective view of the mobile terminal illustrated in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a videoconference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations that differ from those shown in FIGS. 2 and 3.

Figure 4:
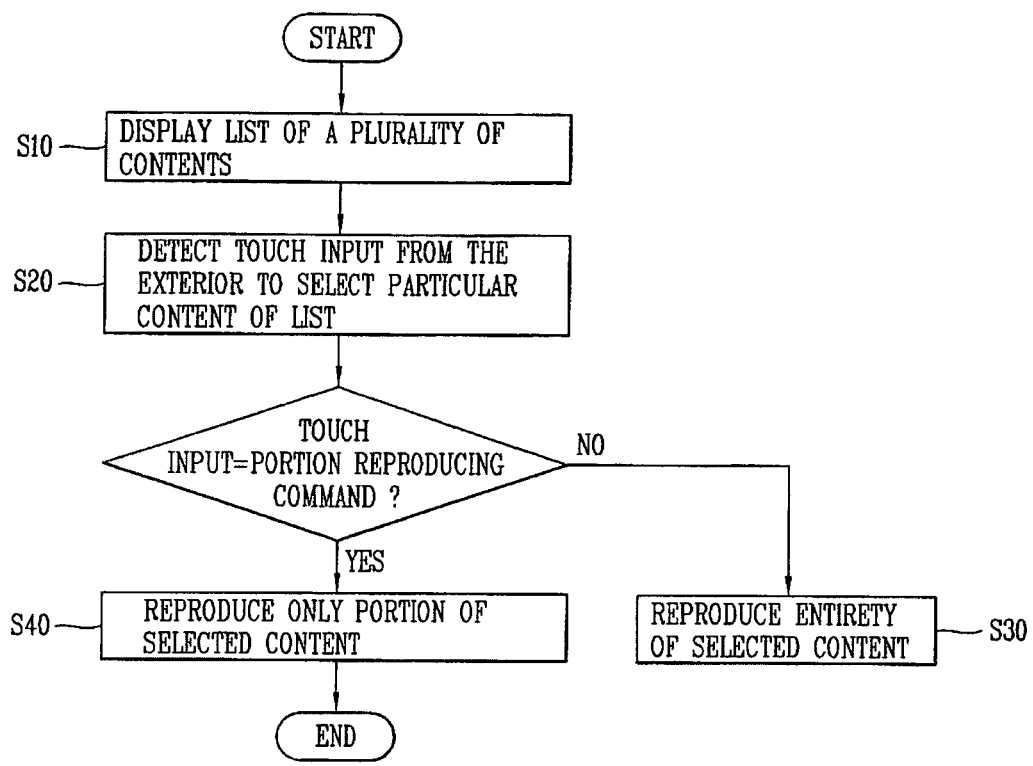
FIG. 4 is a flow chart illustrating a contents reproducing method according to a one embodiment of the present invention.
Figure 5:
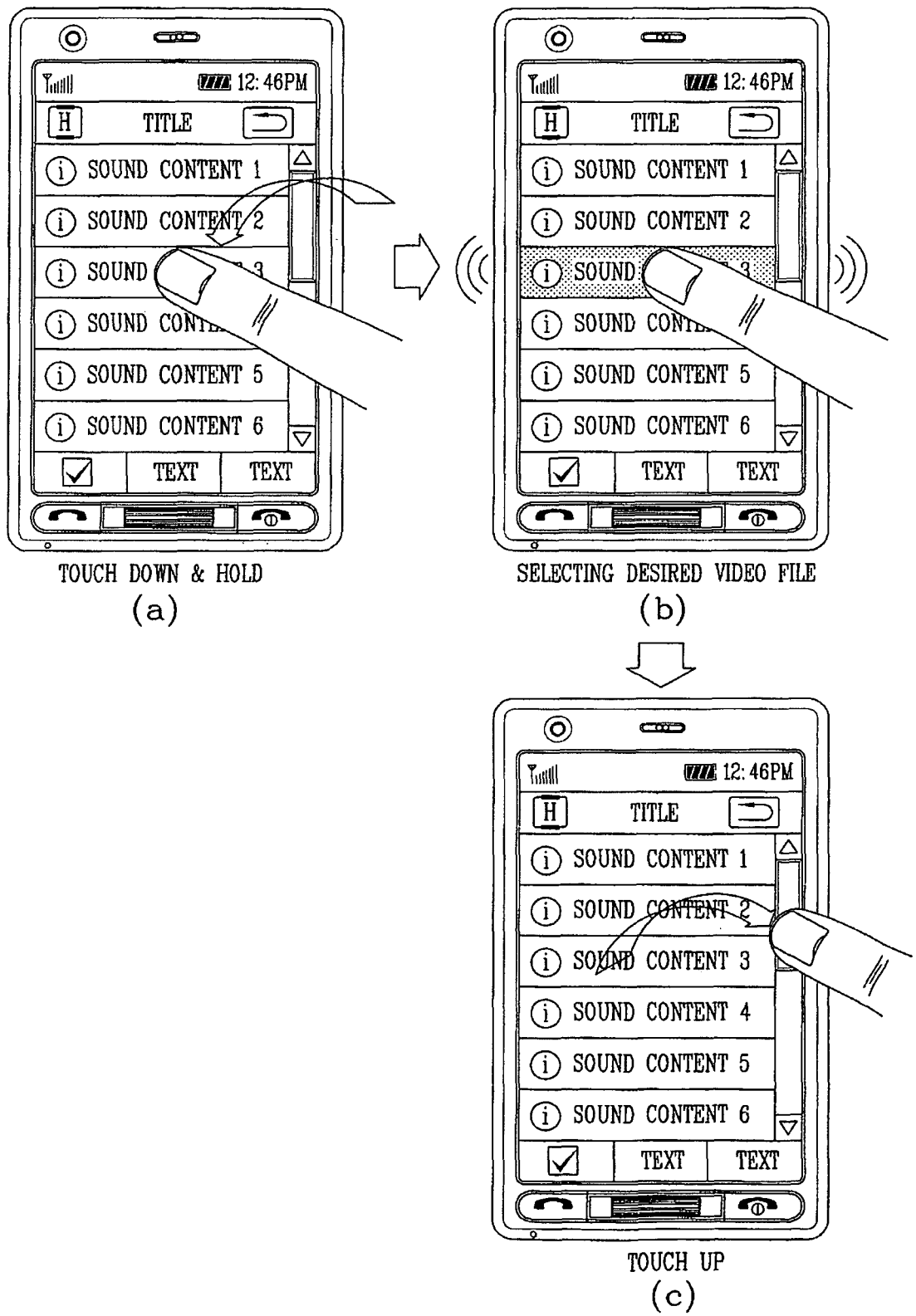
FIG. 5 illustrates display configurations and touch inputs on the mobile terminal according to an embodiment of the present invention.

FIG. 4 is a flow chart illustrating a contents reproducing method according to one embodiment of the present invention. FIG. 5 illustrates screen display configurations and touch inputs on the mobile terminal 100 according to an embodiment of the present invention. The contents reproducing operation of the mobile terminal according to an embodiment of the present invention will be described with reference to FIGS. 4 and 5.

A contents list, such a title list of music files, is displayed on a screen of the mobile terminal in response to an external input, such as an input by a user's touch via the user's hand, stylus, or a button input (S10). As illustrated in FIG. 5(a-c), the user may touch a particular content on the list to select a music file to reproduce. The controller 180 detects the user's touch via the touch screen (S20) and reproduces either the entirety (S30) or only a portion of the selected music file (S40) according to the detected touch type.

For example, the controller 180 may determine the detected touch input as either a one-time touch or a multi-time touch and reproduce a corresponding music file entirely or partially. Alternatively, the controller 180 may determine the detected touch input as either a one-point touch or a multi-point touch, as either a short touch or a long touch, or as either a first-region touch or a second-region touch and reproduce corresponding music file entirely or partially.

A setting menu is provided to set types of touch inputs according to a user's preference for the types of the touch inputs for reproducing the entirety or a portion of music files. This allows the user to select a desired type of touch input.

Figure 6:
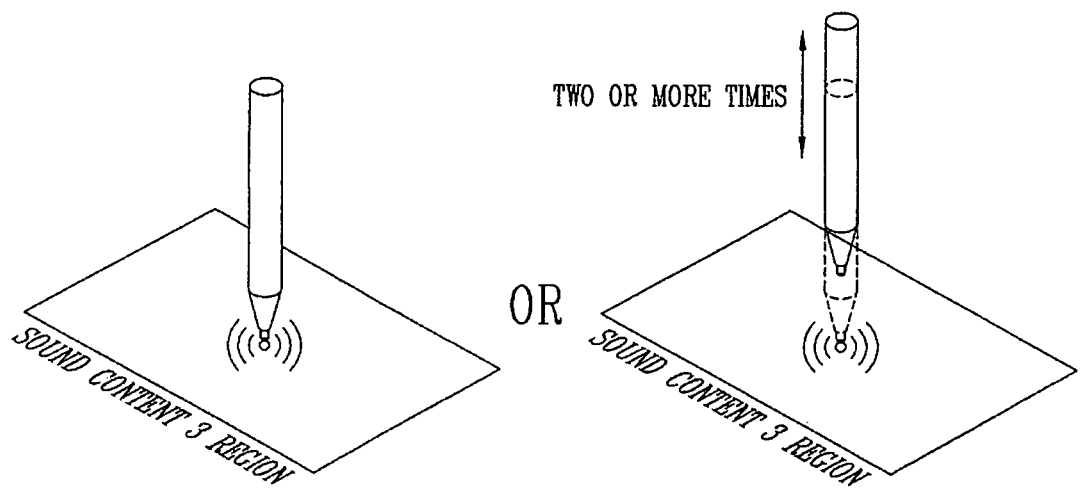
FIG. 6 illustrates a contents reproducing method according to a one embodiment of the present invention.

FIG. 6 illustrates a contents reproducing method according to an embodiment of the present invention in which a touch input is determined as either a one-time touch or multi-time touch. As illustrated in FIG. 6, when a touch input is determined as either a one-time touch or a multi-time touch (S20), the controller 180 counts the number of touches detected via the touch screen during a specific time period.

During the specific time period, if one touch input is detected, the controller 180 determines the touch input as a portion reproduction command and reproduces only a specific portion of a corresponding music file, such as a sound content 3. Partially reproducing the music file is referred to as pre-listening or preliminary play.

When the user's touch input is determined as the pre-listening or preliminary play command, the controller 180 reproduces only a portion of a predetermined music file, with a time duration of five seconds to twenty seconds. The specific time period for counting the touch inputs or the time duration for reproducing the pre-listening may vary according to user settings.

On the other hand, if two or more touch inputs are detected during the specific time period, the controller 180 determines the touch input as the entire reproduction command or a play command and reproduces the music file from the beginning to the end.

Figure 7:
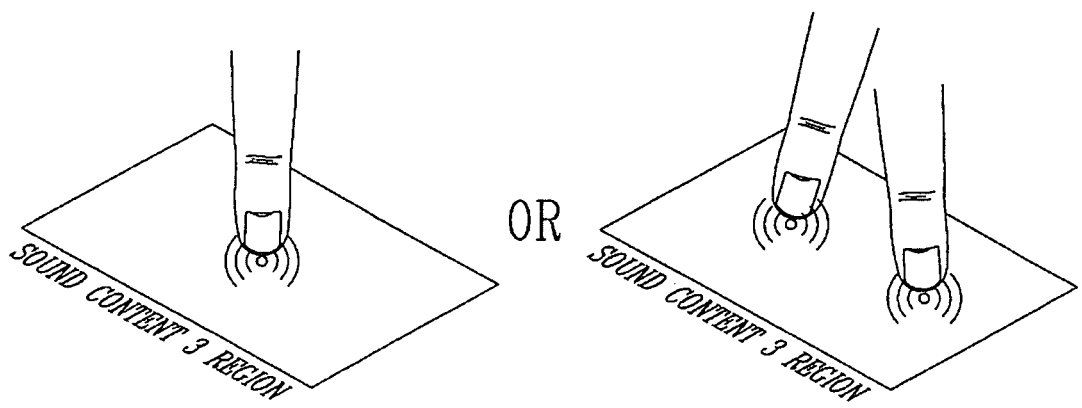
FIG. 7 illustrates a contents reproducing method according to another embodiment of the present invention.

FIG. 7 illustrates a contents reproducing method according to an embodiment of the present invention in which a touch input is discriminated as either a one-point touch or a multi-point touch. As illustrated in FIG. 7, when a user's touch is input via the touch screen in (S20), the controller 180 determines whether the user's touch is detected only at one point or at two or more points of a sound content 3 region.

If the user's touch is detected only at one point of the sound content 3 region, the controller 180 determines the touch as a pre-listening or a preliminary play command and reproduces only a portion, such as five seconds or 20 seconds, of a predetermined music file. As mentioned previously, the reproduction time of the pre-listening may vary according to user settings.

On the other hand, if the user's touch is detected at two or more points of the sound content 3 region, the controller 180 reproduces the music file, specifically, the sound content 3, from the beginning to the end.

Another contents reproducing method according to the present invention is determining a touch input (S20) as either a short touch or a long touch. In this embodiment, the controller 180 measures a touch time of the user input via the touch screen. A short touch refers to a general touch input, specifically to a user's touch of the screen for a short time. A long touch refers to a user's touch of the screen for more than a specified time period.

If the user input is determined to be a short touch, the controller 180 regards the touch as a pre-listening or preliminary play command and reproduces only a certain interval, such as five seconds to twenty seconds, of the music file. On the other hand, if a user input is determined to be a long touch, the controller 180 reproduces the music file, from the beginning to the end. The specified time for determining the long touch or the reproduction time of pre-listening may vary according to user settings.

Figure 8:
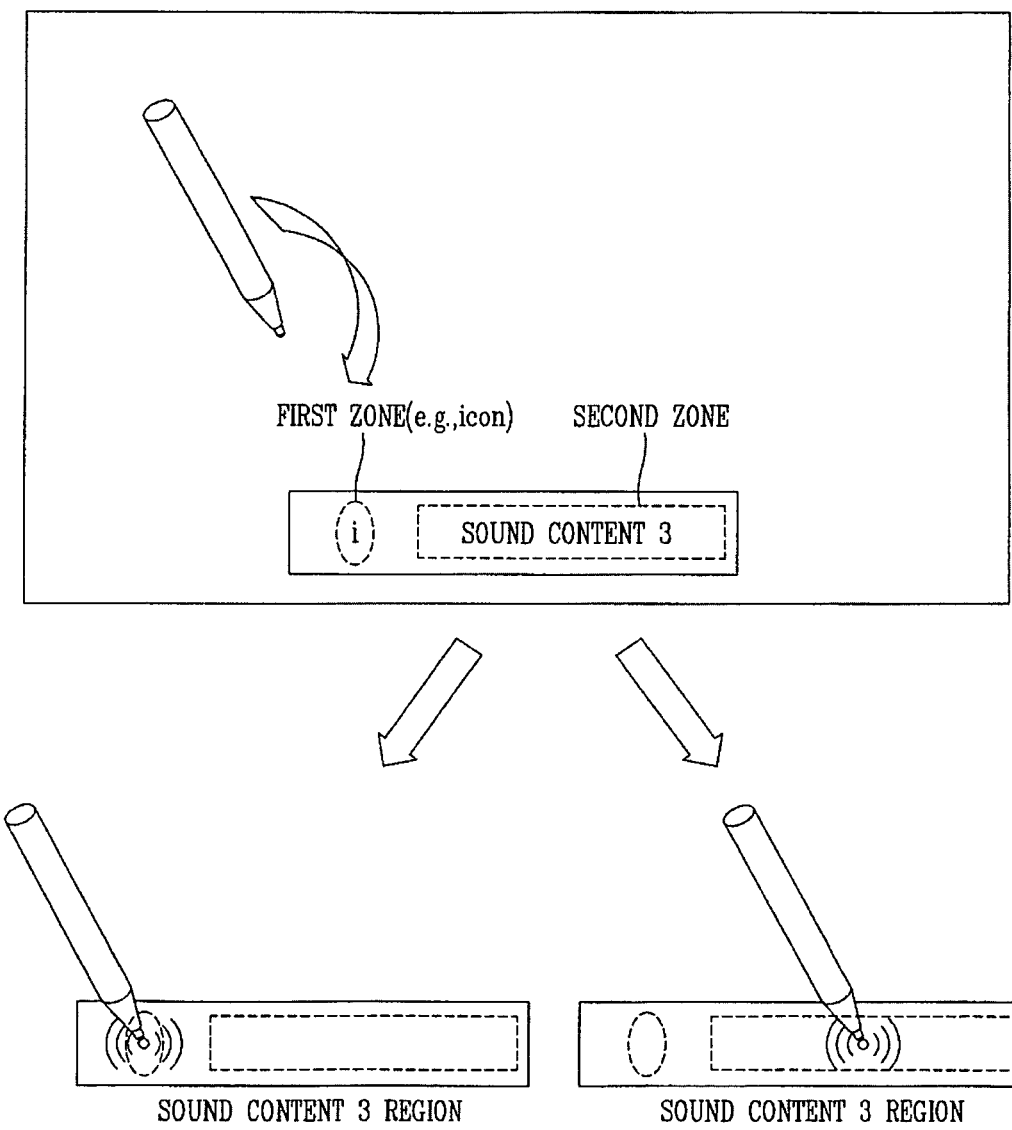
FIG. 8 illustrates a contents reproducing method according to another embodiment of the present invention.

FIG. 8 illustrates a contents reproducing method according to an embodiment of the present invention in which a touch input is determined as either a touch to a first region or a touch to a second region. As illustrated in FIG. 8, when a user touch is input via the touch screen (S20), the controller 180 determines whether the user touch is detected at a first region, such as icon 'i', or at a second region, such as a title of a music file such as the illustrated sound content 3 region.

If the user touch is detected at the icon 'i' region, the controller 180 determines the touch as a pre-listening or pre-liminary play command and reproduces only a certain interval, such as five seconds to twenty seconds, of the music file. The reproduction time of pre-listening may vary depending on user settings. On the other hand, if the user touch is detected at the second region corresponding to the title of the music file, the controller 180 reproduces the music file from the beginning to the end.

Figure 9:
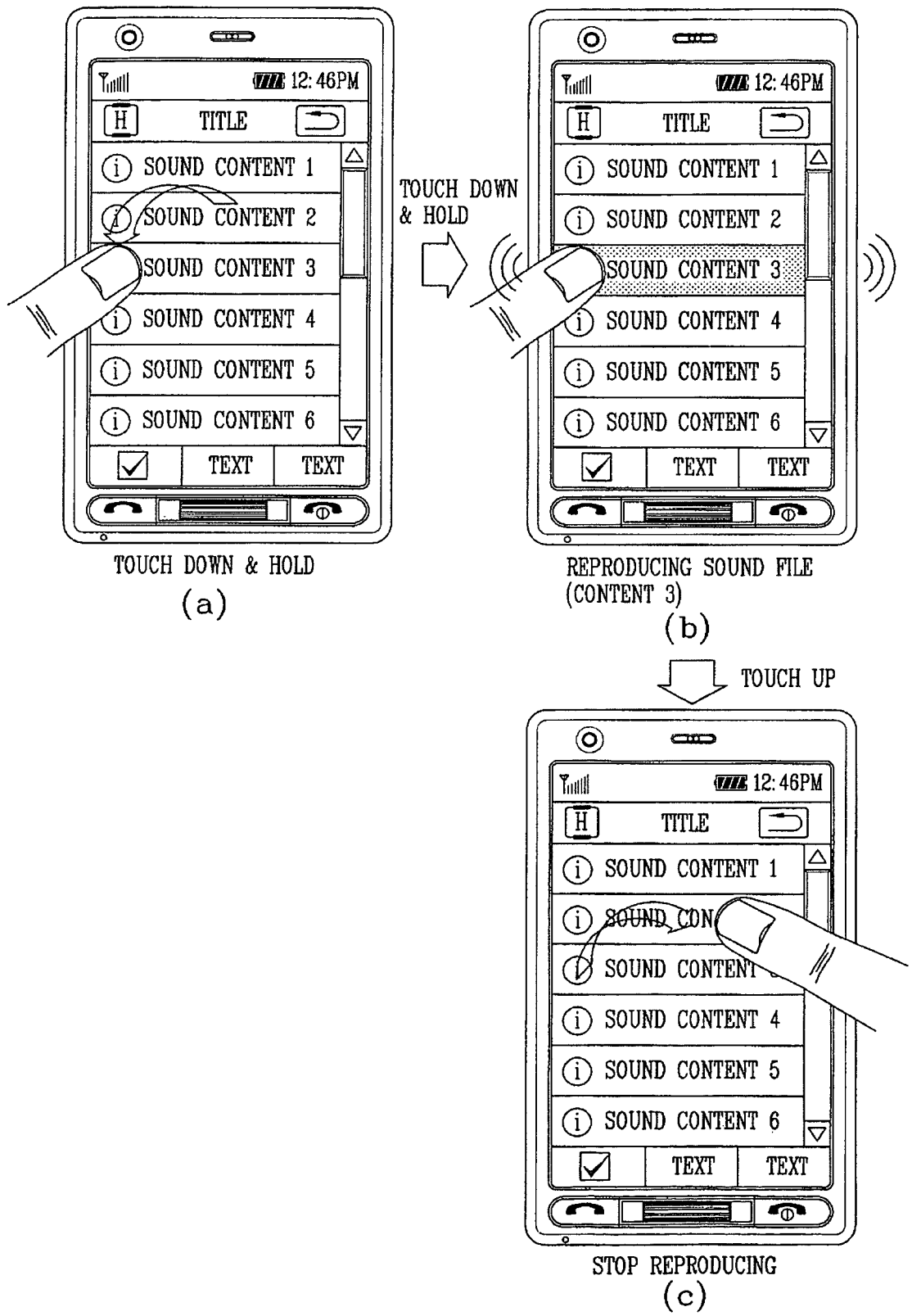
FIG. 9 illustrates a contents reproducing method according to another embodiment of the present invention.

In an alternate embodiment, the music file may be reproduced only while a touch is detected at the icon 'i' region. As illustrated in FIG. 9(a-c), the controller 180 in this embodiment may reproduce the music file only while the user puts his hand or a stylus on a particular region, such as the icon 'i' region. When the user removes his hand or the stylus, the controller 180 stops reproducing the music file. Similar to the example illustrated in FIG. 8, if the user touches the second region corresponding to the title part of the music file, the controller 180 reproduces the music file from the beginning to the end.

In the illustrated embodiments of the present invention, an external input such as, a user input is received via a touch screen. However, the present invention is not limited to inputs received via a touch screen and the sound reproducing method according to the present invention can be also implemented with a button input using a keypad in the same manner. Specifically, the entire reproducing and a portion reproducing may be determined according to types of button inputs, such as either as a one time button input or a multi-time button input, or either a short button input or a long button input.

Unlike the related art in which a soft key must be provided to perform a portion reproducing, such pre-listening or a preliminary play of contents, and the portion reproducing requires at least two steps, the mobile terminal according to the present invention can perform a portion reproducing or an entire reproducing of contents effectively and quickly. Because the determination of whether to reproduce contents partially or entirely is made according to a type of a detected touch, contents desired by the user can be effectively searched and reproduced.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for reproducing audio content in a mobile terminal, the method comprising:
   displaying, on a display of the mobile terminal, a list of a plurality of regions each associated with audio content and including an icon and a title associated with corresponding audio content; and
   reproducing specific audio content among the audio content in different intervals based on at least a portion of the display where a touch input is applied or a time duration during which the touch input is detected on the display,
   wherein the specific audio content is reproduced from beginning to end if the touch input is applied to the title included in a region associated with the specific audio content among the plurality of regions,
   wherein only a predetermined portion of the specific audio content is reproduced if the touch input is applied to the icon included in the region associated with the specific audio content, the predetermined portion reproduced only while the touch input is maintained on the icon.

2. A mobile terminal comprising:
   a display configured to display a list comprising a plurality of regions each associated with audio content, including an icon and a title associated with corresponding audio content; and
   a controller configured to reproduce specific audio content among the audio content in different intervals based on at least a portion of the display where a touch input applied is applied or a time duration during which the touch input is detected on the display,
   wherein the specific audio content is reproduced from beginning to end if the touch input is applied the title included in a region associated with the specific audio content among the plurality of regions,
   wherein only a predetermined portion of the specific audio content is reproduced if the touch input is applied the an icon included in the region associated with the specific audio content, the predetermined portion reproduced only while the touch input is maintained on the icon.

* * * * *